(12) United States Patent
Grecco et al.

(10) Patent No.: US 6,820,647 B1
(45) Date of Patent: Nov. 23, 2004

(54) VALVE POSITION MONITOR

(75) Inventors: John Jude Grecco, Butler, NJ (US); Antimo J. Martin, Piscataway, NJ (US); Leo Minervini, Saddle Brook, NJ (US); Franklin H. Sinclair, New Orleans, LA (US)

(73) Assignee: Westlock Controls Corporation, Saddle Brook, NJ (US)

( * ) Notice: Subject to any disclaimer, the term of this patent is extended or adjusted under 35 U.S.C. 154(b) by 146 days.

(21) Appl. No.: 10/141,474

(22) Filed: May 8, 2002

(51) Int. Cl.$^7$ .............................................. F16K 37/00
(52) U.S. Cl. ...................... 137/552; 137/137; 137/554; 137/556
(58) Field of Search ................................ 137/552, 553, 137/554, 556, 556.3

(56) References Cited

U.S. PATENT DOCUMENTS

| | | | |
|---|---|---|---|
| 4,046,350 A | * 9/1977 | Massey et al. ............... | 137/556 |
| 4,406,303 A | * 9/1983 | Kilmoyer .................... | 137/554 |
| 4,494,565 A | 1/1985 | Sinclair et al. ............. | 137/555 |
| 4,494,566 A | 1/1985 | Sinclair et al. ............. | 137/556 |
| 4,518,008 A | * 5/1985 | Fenster et al. .............. | 137/552 |
| 4,635,901 A | 1/1987 | Pond .......................... | 251/355 |
| 5,178,187 A | 1/1993 | Raymond, Jr. et al. ...... | 137/556 |
| 5,223,822 A | 6/1993 | Stommes et al. ........... | 340/686 |
| 5,277,223 A | * 1/1994 | Glockner et al. ........... | 137/554 |
| 5,342,025 A | 8/1994 | Hwang ........................ | 251/65 |
| 5,469,805 A | 11/1995 | Gibbs ......................... | 116/284 |
| 5,518,028 A | 5/1996 | Walker ........................ | 137/554 |
| 5,535,698 A | 7/1996 | Trevisan ..................... | 116/277 |
| 5,579,800 A | 12/1996 | Walker ........................ | 137/15 |
| 5,584,319 A | 12/1996 | Cholin ........................ | 137/554 |
| 5,623,963 A | 4/1997 | Stommes et al. ........... | 137/554 |
| 5,647,396 A | 7/1997 | Stommes et al. ........... | 137/554 |
| 5,957,158 A | 9/1999 | Volz et al. .................. | 137/556 |
| 6,019,126 A | 2/2000 | Kelada ....................... | 137/493.8 |
| 6,079,442 A | 6/2000 | Raymond, Jr. et al. ..... | 137/554 |
| 6,135,147 A | 10/2000 | Peters et al. ............... | 137/556.3 |

OTHER PUBLICATIONS

Technical Bulletin (tech–248/D.W.O10876) entitled "Installation & Operating Instructions for Eazical Ir Positioner", 10pp., Oct. 31, 2000, Westlock Controls Corp., Saddle Brook, NJ.
Technical Bulletin (tech–252/D.W.O.10818) entitled "Installation & Operating Instructions for XA Position Monitors", 4pp., Oct. 31, 2000, Westlock Controls Corp., Saddle Brook, NJ.
Technical Bulletin (tech–211/D.W.O.10876) entitled, "Installation & Operating Instructions for ER Position Monitors", 4pp., Rev. A: Oct. 31, 2000, Westlock Controls Corp., Saddle Brook, NJ.
Technical Bulletin entitled "Installation & Operating Instructions Quantum 749 &757 with Hermetically Sealed Magnum Proximity Sensors", 1p., Westlock Controls Corp., Saddle Brook, NJ.

\* cited by examiner

Primary Examiner—John Rivell
(74) Attorney, Agent, or Firm—Elizabeth A. O'Brien; William F. Dee

(57) ABSTRACT

A valve position monitor that provides simultaneous visual and electrical signals of valve position is disclosed. A method of monitoring the position of a valve by utilizing the valve position monitor described herein is also disclosed.

5 Claims, 2 Drawing Sheets

VALVE POSITION MONITOR

FIELD OF THE INVENTION

This invention relates generally to an apparatus for monitoring the position of a valve, more particularly an apparatus that delivers simultaneous visual and electrical signals corresponding to valve position.

BACKGROUND

Valve position monitors are important components of effective process control systems in industrial and laboratory settings. Valve position monitors enable the operator to determine the operational position of a fluid handling valve. Generally such valve position monitors transmit the position of a valve, such as whether the valve is completely open, completely closed, or some position therebetween. Monitoring systems have shown particular value in environments where access to valves is limited and physical inspections of each control valve are necessary to ascertain the operational position. Physical inspections are time consuming. Such inspections also unnecessarily expose operators to possibly dangerous and hazardous situations characteristic of certain industrial and laboratory environments.

Valve position monitoring systems allow for visual indication of valve position, in some environments at a distance of up to 150 feet. Valve position monitoring systems allowing for visual indication or the transmission of an electrical signal indicating valve position are well known in the art. Others have developed valve position monitors wherein both visual indication and transmitted electrical signals are provided. Exemplary of these valve position monitors with combined visual and electrical signals are U.S. Pat. Nos. 5,277,223; 5,223,822; and 6,135,147.

An object of this invention is to provide a valve position monitor that provides simultaneous visual and electrical signals of valve position, and that is easily adjustable.

A further object of this invention is to provide a method of monitoring the position of a valve by utilizing the valve position monitor described herein.

SUMMARY OF THE INVENTION

The present invention relates to a valve position monitor for delivering simultaneous visual and electrical signals of valve position and a method of monitoring valve position utilizing the valve position monitor. The valve position monitor comprises a body and at least one limit switch, the valve position monitor adapted to be connected to a valve actuator housing. The body in more detail comprises an output shaft, at least two trigger housings having at least one trigger that is detected by a limit switch, a biasing means, and a first means adapted to be secured to the valve actuator. Each trigger housing is capable of independent rotation and adjustment with respect to each other and with respect to the output shaft. In addition to a trigger, at least one of the two trigger housings has visual indicia thereon to provide a simultaneous visual signal. Any limit switch may be used provided that the limit switch detects the trigger and transmits an electrical signal representative of the valve position. Also, the present invention relates to a method of monitoring the position of a valve by utilizing the valve position monitor described herein.

DETAILED DESCRIPTION OF THE PREFERRED EMBODIMENT

Figure 2:
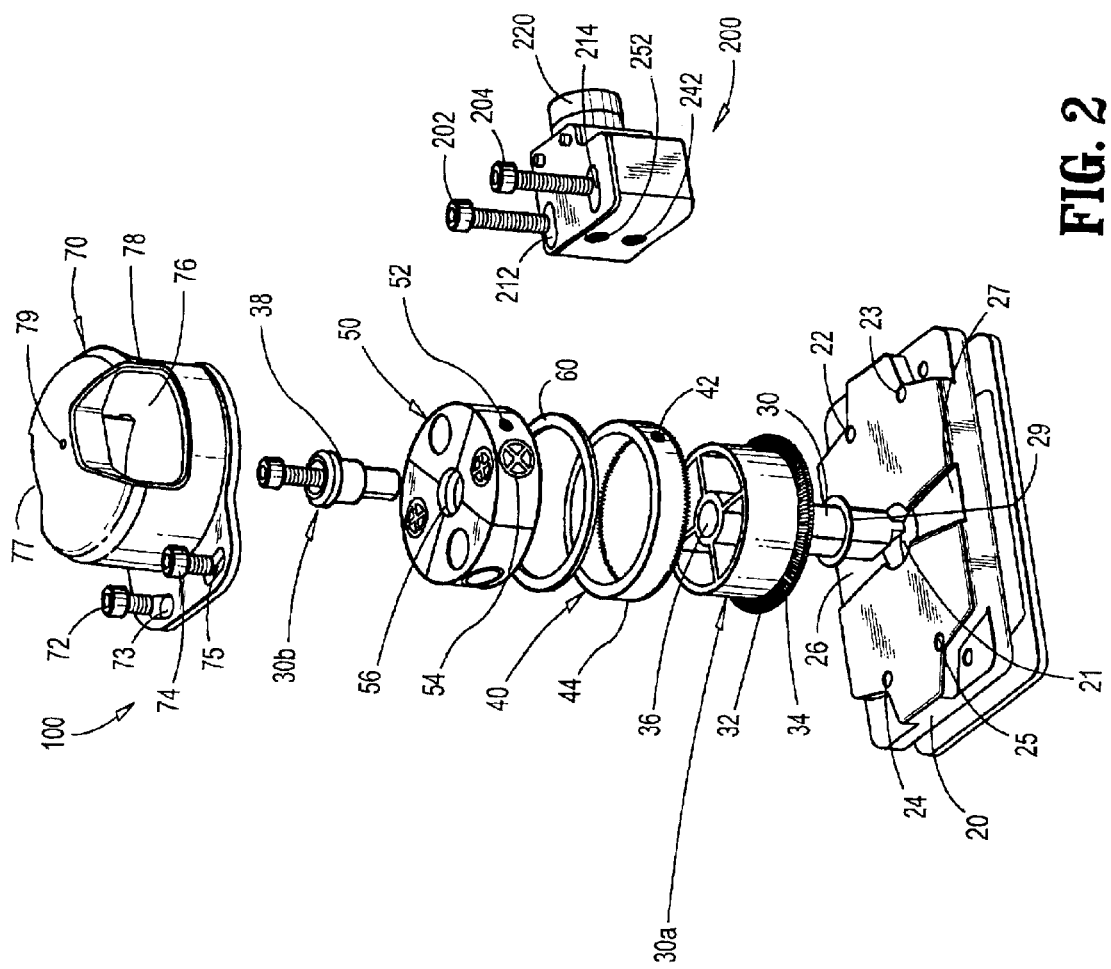
FIG. 2 is an exploded perspective view of the valve position monitor according to the present invention.

The current invention is described for use with any valve actuator having a driven member, such as a shaft, stem, or the like that is movable between a first position and a second position. Preferably, the valve actuator is a rotary actuator.

The present invention relates to a valve position monitor for delivering simultaneous visual and electrical signals of valve position and a method of monitoring valve position utilizing the valve position monitor. With reference to the drawings, the valve position monitor comprises a body and at least one limit switch, the valve position monitor adapted to be connected to a valve actuator housing. The body in more detail comprises an output shaft, at least two trigger housings having at least one trigger that may be detected by a limit switch, a biasing means, and a first means adapted to be secured to the valve actuator. Each trigger housing is capable of independent rotation and adjustment with respect to each other and with respect to the output shaft. In addition to a trigger, at least one of the two trigger housings has visual indicia thereon to provide a visual signal. Any limit switch may be used provided that the limit switch detects the trigger and transmits an electrical signal representative of the valve position. Also, the present invention relates to a method of monitoring the position of a valve by utilizing the valve position monitor described herein.

In more detail the body component includes the output shaft, trigger housings, the biasing means, and the first means adapted to be secured to the valve actuator. The output shaft is adapted to be connected to the rotatable shaft of the valve actuator, driving the rotation of the valve position monitor when operated from a first position to a second position. The output shaft further comprises interlocking means to interlock with similar interlocking means of each of the trigger housings. Preferably, the output shaft comprises an inner core and a retainer bushing.

The body includes at least two trigger housings. Additional trigger housings may be utilized. Each trigger housing contains at least one trigger. More than one trigger on a trigger housing may be included to allow for additional signals. Preferably, the body comprises two trigger housings, each with one trigger that is detected by a limit switch. The triggers may be any inductive, magnetic, mechanical, or electrical trigger which, when detected by a limit switch, is capable of transmitting an electrical signal of valve position. Preferably, the trigger is a magnet.

At least one of the trigger housings has visual indicia thereon. The visual indicia comprise a combination of color and symbols to provide the visual signal. Any combination of color and/or symbols that supplies a good contrast for accurate visual inspection is sufficient for purposes of this invention. For example, the word "OPEN" may be used on a green background and the word "CLOSED" on a red background. Preferably, the trigger housing has white and black sections, the white section having a black circle thereon representing the open position and the black section having a white circle thereon with a white "X" therein representing the closed position.

The body further comprises a biasing means. The biasing means must have sufficient elasticity to keep each trigger housing interlocked with the output shaft such that the trigger housings move together as the valve is operated from a first to a second position. In addition, the biasing means must be sufficiently compressible to allow the operator to easily disengage each trigger housing independently for adjustment purposes. Commercially available biasing means include springs comprised of both polymeric and metallic materials. Preferably, the biasing means is a wave spring, or more preferably, a wave spring made of a polymeric material.

The body further comprises a first means adapted to be secured to the valve actuator to allow the visual signal to be detected. The first means has at least one opening through which the operator may view the visual indicia on the trigger housing. Preferably, the first means has two such openings. More preferably, the first means is a housing with three openings, two openings to allow for visual inspection of the visual indicia at multiple angles and one opening to allow the limit switch to fit in close proximity to the trigger housings. The openings may be enclosed with a transparent material, however the openings are preferably kept open for cleaning efficiency in the operating environment.

Fasteners secure the first means as well as the limit switch to the valve actuator housing. Fasteners such as snaps or clips may be used provided they restrict the movement of the first means to that of the valve actuator housing during valve operation. Further, the first means may be secured without fastening means, such as for example a molded snap fit. Preferably, the fasteners are screws which connect the first means and the limit switch to the valve actuator.

If desired, a second means may be provided to secure the body and the limit switch to the valve actuator. Preferably, the second means is a base plate. The second means may comprise a fourth means for preventing fluid from entering an output shaft aperture. Said fourth means preferably are drainage channels molded within the second means and designed to prevent fluid from entering the valve actuator through the output shaft aperture. Drainage channels may be designed in any pattern provided they draw fluid away from the output shaft aperture.

The valve position monitor also comprises at least one limit switch, or limit sensor, to detect the at least one trigger and transmit an electrical signal of valve position. Any limit switch may be used provided it is capable of detecting a trigger and transmitting an electrical signal. Such commercially available switches and sensors are comprised of inductive, magnetic, mechanical, or electrical means. Preferably, the valve position monitor is comprised of two limit switches, each limit switch capable of detecting the at least one trigger on each trigger housing.

Figure 1:
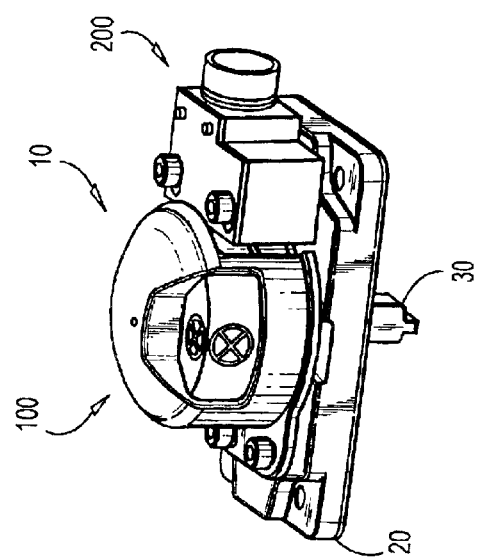
FIG. 1 is a perspective view of the valve position monitor according to the present invention.
Figure 3:
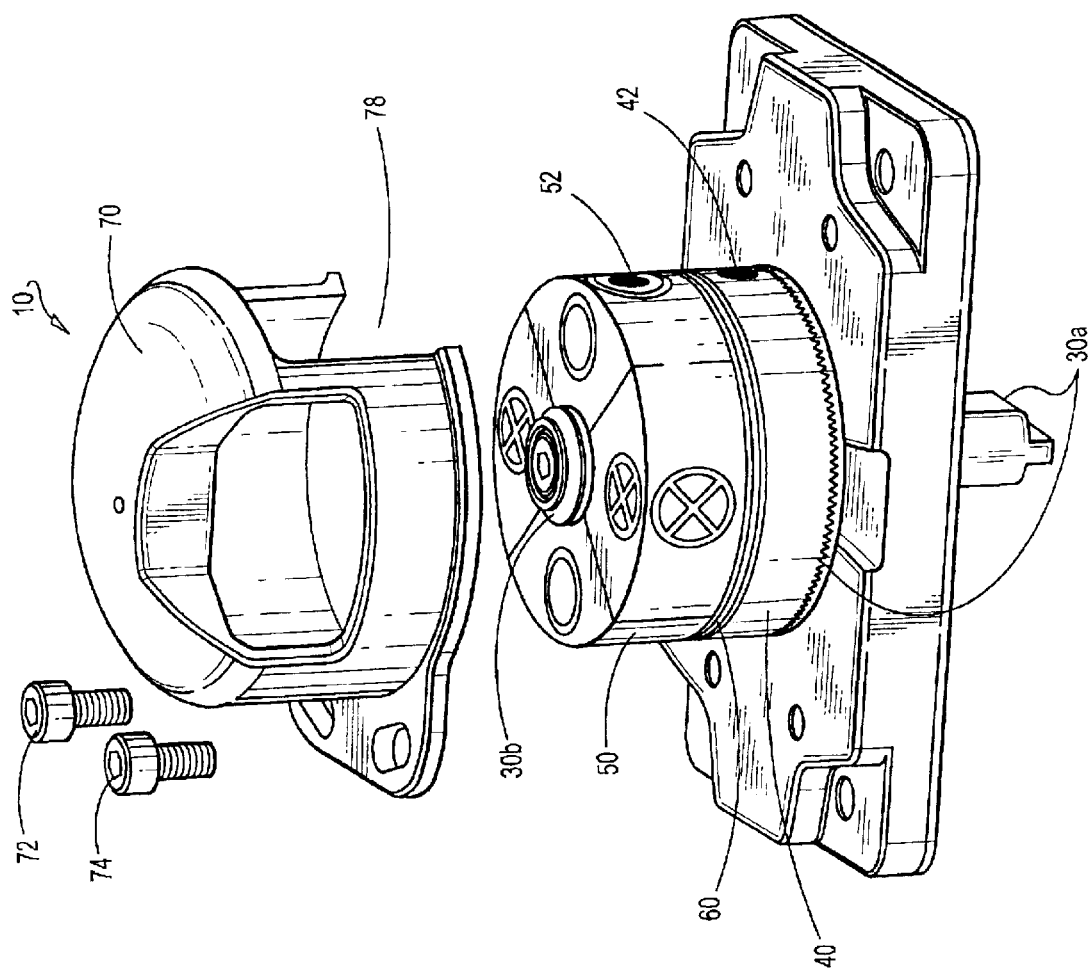
FIG. 3 is a partially exploded view of the valve position monitor according to the present invention.

In more detail FIGS. 1–3 describe the following preferred embodiment for a valve position monitor. FIG. 1 depicts a valve position monitor 10. The valve position monitor 10 comprises a body 100 and a limit switch 200, each of which is connected to a valve actuator by a second means, or base plate 20. Body 100 is adapted to engage the rotatable shaft of the actuator to which it is connected by means of an output shaft 30.

FIG. 2 represents an exploded view of body 100. In more detail FIG. 2 describes a first means, shown as a housing 70. Housing 70 is secured to the valve actuator with screws 72, 74 through holes 73 and 75. Housing 70 includes three openings, or windows, identified as visual windows 76 and 77, and a trigger window 78 (best shown on FIG. 3). The operator views the visual indicia 54 on trigger housing 50 through visual windows 76 and 77. Trigger window 78 allows limit switch 200 to fit in close proximity to the trigger housings to ensure accurate detection of the triggers by the limit switches. The housing 70 also includes an orifice 79. Orifice 79, in addition to windows 76, 77, and 78, reduce the potential for the buildup of fluids during cleaning operations.

Body 100 further comprises two trigger housings 40 and 50. Each trigger housing houses one trigger, shown as triggers 42 and 52. Trigger 42 is a magnet embedded within trigger housing 40. Similarly, trigger 52 is a magnet embedded within trigger housing 50. Each trigger housing has means for interlocking with similar interlocking means of the output shaft 30. Trigger housing 40 has interlocking means 44. Trigger housing 50 has interlocking means 56.

Trigger housing 50 also includes visual indicia 54 thereon. The visual indicia 54 on the trigger housing 50 shown in FIG. 2 comprise a combination of color and symbols. The surface of trigger housing 50 is divided into sections, the first and third sections bearing the mark of a first visual indicia and the second and fourth sections bearing the mark of a different second visual indicia. The first and third sections are black and the second and fourth sections are white. A symbol is located on the surface of each section. A black, open circle, reflecting an open position, is on the white sections. A white circle with a white "x" inside the circle, reflecting the closed position, is on the black sections. As the valve position monitor responds to the operation of the valve the visual indicia 54 of trigger housing 50 is viewed through visual window 76 of housing 70. Referring again to FIG. 1, the valve described therein is shown in the closed position.

Located between the two trigger housings is a biasing means 60. Biasing means 60 supplies sufficient tension to keep the interlocking means of each trigger housing interlocked with similar means on the output shaft 30. The biasing means 60 is a wave spring comprised of a polymeric material.

The output shaft 30 is comprised of an inner core 30a and a retainer bushing 30b. The inner core 30a has a recess 36 on the top surface to receive retainer bushing 30b, thus forming output shaft 30. Inner core 30a has a generally circular shape with an outside circumferential flange 32 having interlocking means 34 on the surface thereof. These interlocking means 34 engage interlocking means 44 on trigger housing 40. Similarly, interlocking means 56 interlock with interlocking means 38 of retainer bushing 30b. When interlocked in this manner the trigger housings and biasing means are operatively connected to the output shaft 30. One skilled in the art will understand that the shape and design of the output shaft 30 described herein is not limiting to this invention so long as it provides an operating output shaft for the body 100, and is capable of being adapted to be connected to a valve actuator for rotation therewith.

The body also comprises a second means, shown as a base plate 20 on FIG. 2, to connect the body 100 and limit switch 200 to the actuator housing. Second means 20 contains an output shaft aperture 21 through which the output shaft 30 connects to the valve actuator. Body 100 is secured to the valve actuator by screws 72 and 74, passing through holes 73 and 75 of the housing 70 and mounting bores 24 and 25 of the second means 20. Similarly, limit switch 200 is secured to the valve actuator by screws 202 and 204 through holes 212 and 214 of the limit switch 200 and mounting bores 22 and 23 of the second means 20. Drainage channels 26 and 27 have been molded into the base plate 20 on opposite sides of the output shaft aperture 21. These channels 26 and 27 create a downward sloping gradient away from the output shaft aperture 21 to prevent fluid from entering into the actuator housing through output shaft aperture 21. A gasket 29 also aids in sealing output shaft aperture 21 from fluid ingression.

The manner in which the valve position monitor is intended to operate and easily adjust is best shown in FIG. 3, a partially exploded view of the valve position monitor of the current invention. The valve position monitor 10 as shown provides both visual and electrical signals while being designed with a minimal number of components that fit, or nest, in a compact manner. This design also provides an easily adjustable valve position monitor. This feature is advantageous because it is necessary from time to time to adjust the valve position monitor to ensure proper alignment and detection of the triggers.

The adjustable components of the body are accessible by removing screws 72 and 74 and lifting housing 70 to expose the trigger housings 40 and 50 as well as biasing means 60. As shown in FIG. 3 trigger housing 40 nests compactly with inner core 30a. In addition the biasing means 60 and trigger housing 50 are compressed and secured in a compact position by retainer bushing 30b.

Referring to FIGS. 1 and 2, in order to adjust the valve position monitor 10 the operator disengages the trigger housing 40 from the output shaft 30 by lifting trigger housing 40, thus compressing biasing means 60. Once disengaged the operator may freely rotate the trigger housing 40 until trigger 42 on trigger housing 40 is detected by limit switch 242, transmitting a signal representative of valve position to a remote location through conduit 220. The triggering of limit switch 242 realigns the trigger 42. The operator then releases trigger housing 40. The resiliency of biasing means 60 allows the first trigger housing 40 to retract back into an interlocked position with the output shaft 30.

The valve actuator is then operated to a second position. The operator disengages trigger housing 50 from the output shaft 30 by pushing down against the biasing means 60, again compressing the biasing means 60. Once disengaged the operator may now freely rotate trigger housing 50 until trigger 52 is detected by limit switch 252. By aligning trigger 52 in this manner, the visual indicia 54 on trigger housing 50 are realigned simultaneously. Once both triggers have been realigned in this manner, the operator cycles the valve between the first and second positions several times to check the trigger and limit switch alignment. Now reset, the housing 70 is secured back to the base plate 20 with fasteners 72 and 74. The valve position monitor 10 is now realigned.

The valve position monitor described provides simultaneous visual and electrical signals of valve position, and is easily adjustable. The described valve position monitor reduces the opportunity for operator error during the adjustment process by eliminating the need to have a separate housing for each of the visual and electrical indicator components. The described compact design of the valve position monitor is also advantageous for use in environments where space is at a minimum. In many plant environments, for example, it is desirable to place position indicators in tight spaces, often mounted to actuator housings in positions 90, 180, and 270 degrees from that shown in FIG. 1.

In light of the foregoing disclosure of the invention and description of the preferred embodiments, those skilled in this area of technology will readily understand that various modifications and adaptations can be made without departing from the scope and spirit of the invention. All such modifications and adaptations are intended to be covered by the following claims.

We claim:

1. A valve position monitor, adapted to be connected to a valve actuator having a rotatable shaft corresponding to valve position, and providing both a visual and electrical signal of valve position, comprising:
   a) a body comprising:
      i.) an output shaft comprising an inner core and a retainer bushing, said output shaft adapted to engage the rotatable shaft of the valve actuator
      ii.) two trigger housings independently rotatable about said output shaft and axially adjustable about said output shaft, said two trigger housings having one trigger and means for interlocking with interlocking means on said output shaft, and one of said trigger housings having visual indicia thereon;
      iii.) a polymeric wave spring to interlock said trigger housings with said output shaft; and
      iv.) a housing adapted to be secured to the valve actuator, said housing having three opening, and
   b) two limit switches that can detect the triggers and transmit electrical signals of the valve position.

2. A method for monitoring position of a valve comprising connecting the valve position monitor of claim 1 to a valve actuator and utilizing the valve position monitor of claim 1 to monitor the position of the valve.

3. The valve position monitor of claim 1 wherein the housing comprises a second means for preventing buildup of fluid.

4. The valve position monitor of claim 1 wherein the housing comprises a third means for preventing fluid from entering an output shaft aperture.

5. The valve position monitor of claim 1 wherein at least one of said trigger housings is divided to sections, at least on section having a first visual indicia and at least one other section having a different second visual indicia, with no two adjacent sections having identical visual indicia.

* * * * *